United States Patent
Yoshikawa et al.

(10) Patent No.: US 11,287,297 B2
(45) Date of Patent: Mar. 29, 2022

(54) LIQUID MICROMETER WITH A SET FLOW RATE VALUE

(71) Applicant: ADVANCE DENKI KOGYO KABUSHIKI KAISHA, Kasugai (JP)

(72) Inventors: Kazuhiro Yoshikawa, Yokohama (JP); Makio Asano, Yokohama (JP); Hitomi Hashimoto, Kasugai (JP); Takuya Tsuzuki, Kasugai (JP); Kimihito Sasao, Kasugai (JP)

(73) Assignee: ADVANCE DENKI KOGYO KABUSHIKI KAISHA, Kasugai (JP)

( * ) Notice: Subject to any disclaimer, the term of this patent is extended or adjusted under 35 U.S.C. 154(b) by 112 days.

(21) Appl. No.: 16/637,706

(22) PCT Filed: Aug. 8, 2018

(86) PCT No.: PCT/JP2018/029698
§ 371 (c)(1),
(2) Date: Feb. 7, 2020

(87) PCT Pub. No.: WO2019/031532
PCT Pub. Date: Feb. 14, 2019

(65) Prior Publication Data
US 2021/0148740 A1 May 20, 2021

(30) Foreign Application Priority Data
Aug. 9, 2017 (JP) .............................. JP2017-153857

(51) Int. Cl.
*G01F 1/42* (2006.01)
*G01F 15/00* (2006.01)

(52) U.S. Cl.
CPC .............. *G01F 1/42* (2013.01); *G01F 15/005* (2013.01)

(58) Field of Classification Search
None
See application file for complete search history.

(56) References Cited

U.S. PATENT DOCUMENTS

2004/0262428 A1* 12/2004 Wulteputte ........... B05B 12/004
239/290
2007/0176121 A1 8/2007 Lyons
(Continued)

FOREIGN PATENT DOCUMENTS

| JP | S60-171511 A | 9/1985 |
| JP | S60-158208 U | 10/1985 |
| JP | 2007-212444 A | 8/2007 |

OTHER PUBLICATIONS

International Search Report for International Application No. PCT/JP2018/029698 dated Oct. 23, 2018 (3 sheets, 2 sheets translation, 5 sheets total).

(Continued)

*Primary Examiner* — Harshad R Patel
(74) *Attorney, Agent, or Firm* — Kratz, Quintos & Hanson, LLP

(57) ABSTRACT

A liquid micrometer which includes: a liquid flow path which supplies liquid from a liquid supply device to a discharge nozzle; a flow rate sensor provided in the liquid flow path; a control valve provided in the liquid flow path between the liquid supply device and the flow rate sensor; a controller which controls the control valve such that a flow rate measured by the flow rate sensor becomes equal to a set value; a pressure sensor which measures pressure of the liquid injected from the discharge nozzle; and a calculating section which calculates the size of a work from the pressure measured by the pressure sensor in a state where the flow rate is maintained at the set value by the controller.

6 Claims, 2 Drawing Sheets

(56) References Cited

U.S. PATENT DOCUMENTS

| | | | |
|---|---|---|---|
| 2011/0209529 A1 | 9/2011 | Hyatt | |
| 2012/0080104 A1* | 4/2012 | Yamaguchi | G01F 1/6847 |
| | | | 137/559 |
| 2012/0131815 A1* | 5/2012 | Kraus | H01L 21/67051 |
| | | | 34/443 |
| 2014/0034164 A1* | 2/2014 | Yasuda | G05D 7/0652 |
| | | | 137/599.01 |
| 2014/0083159 A1* | 3/2014 | Nagai | G05D 7/0635 |
| | | | 73/1.34 |
| 2017/0274667 A1* | 9/2017 | Pagnon | G01F 15/02 |
| 2018/0266865 A1* | 9/2018 | Shakudo | G05D 7/0635 |

OTHER PUBLICATIONS

Written Opinion of the International Searching Authority for International Application No. PCT/JP2018/029698 dated Oct. 23, 2018 (4 sheets).

* cited by examiner

[Fig. 1]
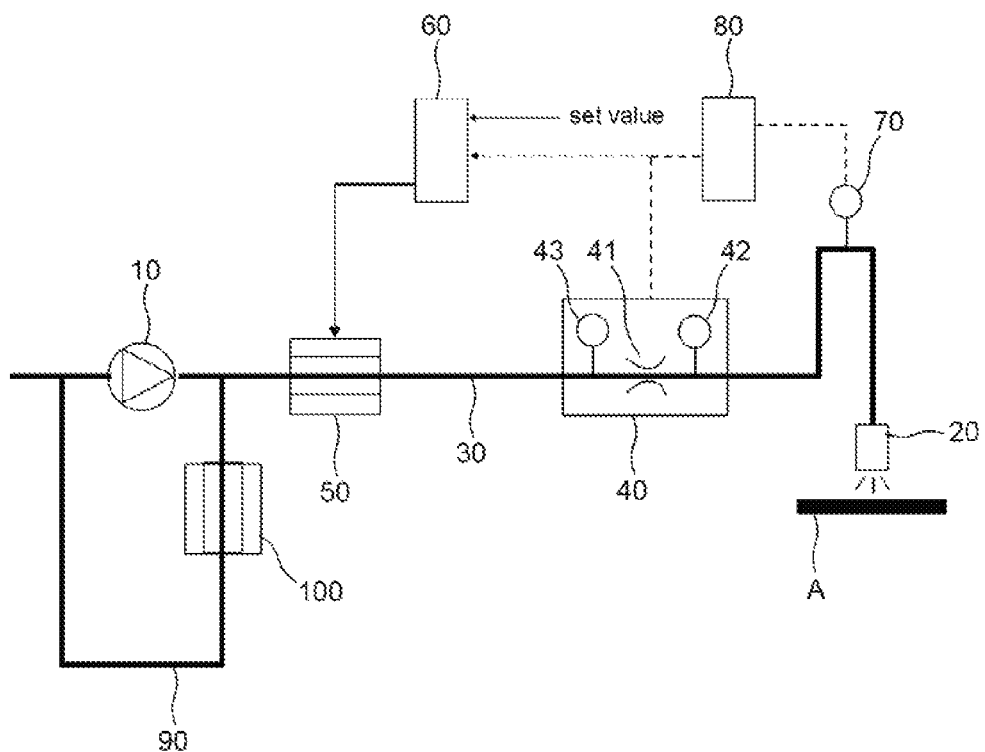

[Fig. 2]
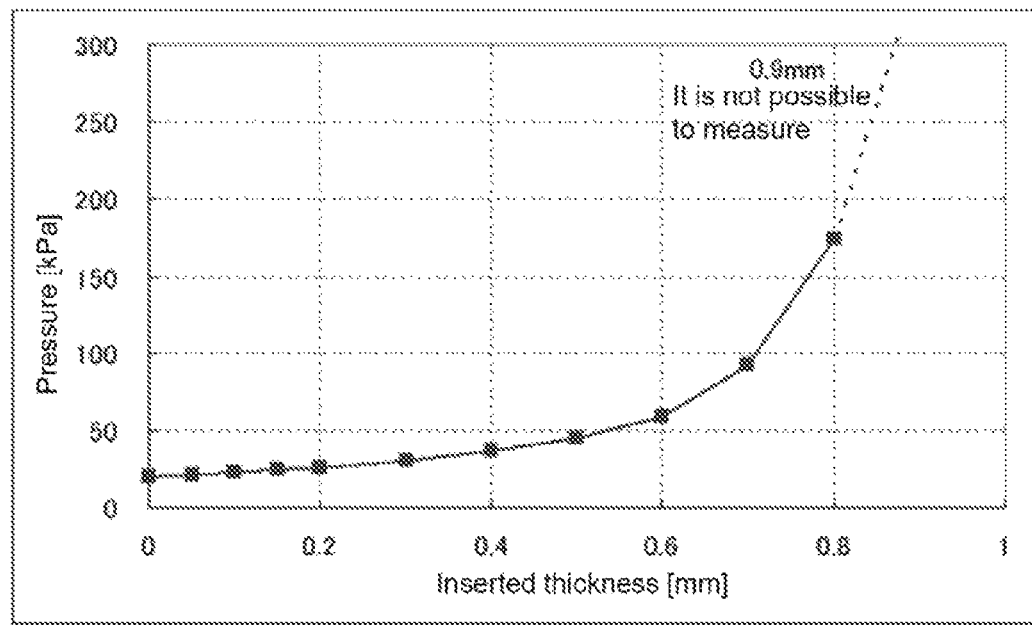

LIQUID MICROMETER WITH A SET FLOW RATE VALUE

TECHNICAL FIELD

The present invention relates to a liquid micrometer which measures a size of a work using liquid.

BACKGROUND TECHNIQUE

There exists an air micrometer capable of precisely measuring a size by easy operation (patent document 1).

Patent document 1 includes a measuring section having an upstream side and a downstream side of an air flowing path partitioned by a porous member, a first pressure sensor which detects first pressure of air on the upstream side of the measuring section and outputs its signal, a second pressure sensor which detects second pressure of air on the downstream side of the measuring section and outputs its signal, and a temperature sensor which detects temperature of air in the measuring section and outputs a signal. The air micrometer captures signals which are output from the first pressure sensor and the second pressure sensor, controls an opening of a control valve of the air flow path such that second pressure of the second pressure sensor becomes a constant value, calculates a mass flow rate per unit, time of air which is injected from an injection hole of a measuring head based on a pressure difference between the first pressure and the second pressure, the second pressure and temperature of air, and calculates a size of a work based on the mass flow rate.

PRIOR ART DOCUMENT

Patent Document

[Patent Document 1] Japanese Patent Application Laid-open No. 2012-58213

SUMMARY OF THE INVENTION

Problem to be Solved by the Invention

However, since gas such as air is compressible fluid, measurement error is seriously large. Gas is susceptible to temperature, and variation of viscosity caused by temperature variation is also large.

When the work is one which is not desired to be dried, gas cannot be used.

Thereupon, it is an object of the present invention to provide a liquid micrometer using liquid.

Means for Solving the Problem

A first aspect of the present invention provides a liquid micrometer in which liquid supplied from liquid supply means is injected from a discharge nozzle toward a work to measure a size of the work, wherein the liquid micrometer includes a liquid flow path which supplies the liquid from the liquid supply means to the discharge nozzle; a flow rate sensor provided in the liquid flow path; a control valve provided in the liquid flow path between the liquid supply means and the flow rate sensor; a controller which controls the control valve such that a flow rate measured by the flow rate sensor becomes equal to a set value; a pressure sensor which measures pressure of the liquid injected from the discharge nozzle; and a calculating section which calculates the size of the work from the pressure measured by the pressure sensor in a state where the flow rate is maintained at the set, value by the controller.

According to a second aspect of the invention, the liquid micrometer of the first aspect further includes: a circulation flow path which branches off from the liquid flow path between the liquid supply means and the control valve and which joins up with an upstream side flow path of the liquid supply means; and a circulation control valve provided in the circulation flow path.

According to a third aspect of the invention, in the liquid micrometer of the first or second aspect, the flow rate sensor is composed of a plurality of pressure sensors, any of the pressure sensors constituting the flow rate sensor is used as the pressure sensor which measures the pressure of the liquid injected from the discharge nozzle.

According to a forth aspect of the invention, in the liquid micrometer in any one of the first to third aspects, the liquid flow path and the discharge nozzle are formed from metal, alloy steel, glass, ceramic or engineering plastic.

According to a fifth aspect of the invention, in the liquid micrometer in any one of the first to forth aspects, the liquid is low viscosity liquid having kinetic viscosity of less than 20 mPa·s.

According to a sixth aspect of the invention, in the liquid micrometer in any one of the first to fifth aspects, the liquid is etching liquid of a silicon wafer.

EFFECT OF THE INVENTION

As compared with gas, liquid has no compressive properties, liquid is less affected by temperature, and viscosity variation of liquid caused by temperature variation is small. According to the present invention, by using such liquid, measurement error is less likely to occur, it is possible to measure a size of a work without bringing the work into a dried state by using liquid, and if liquid is used, it is easy to control a flow rate constant, and by controlling the flow rate of the work constant, a calculation load can be made smaller as compared with pressure-constant control.

BRIEF DESCRIPTION OF THE DRAWINGS

FIG. 1 is a block diagram showing a liquid micrometer according to an embodiment of the present invention; and
FIG. 2 is a graph showing a measurement test result using the liquid micrometer of the embodiment.

MODE FOR CARRYING OUT THE INVENTION

A liquid micrometer of a first aspect of the present. invention includes: a liquid flow path which supplies liquid from liquid supply means to the discharge nozzle; a flow rate sensor provided in the liquid flow path; a control valve provided in the liquid flow path between the liquid supply means and the flow rate sensor; a controller which controls the control valve such that a flow rate measured by the flow rate sensor becomes equal to a set value; a pressure sensor which measures pressure of the liquid injected from the discharge nozzle; and a calculating section which calculates the size of the work from the pressure measured by the pressure sensor in a state where the flow rate is maintained at the set value by the controller. As compared with gas, liquid has no compressive properties, liquid is less affected by temperature, and viscosity variation of liquid caused by temperature variation is small. According to this aspect, by using such liquid, measurement error is less likely to occur, it is possible to measure a size of a work without bringing the work into a dried state by using liquid, and if liquid is used, it is easy to control a flow rate constant, and by controlling the flow rate of the work constant, a calculation load can be made smaller as compared with pressure-constant control.

According to a second aspect of the invention, the liquid micrometer the first aspect further includes: a circulation flow path which branches off from the liquid flow path between the liquid supply means and the control valve and which joins up with an upstream side flow path of the liquid supply means; and a circulation control valve provided in the circulation flow path. According to this aspect, it is easy to adjust a flow rate.

According to a third aspect of the invention, in the liquid micrometer of the first or second aspect, the flow rate sensor is composed of a plurality of pressure sensors, any of the pressure sensors constituting the flow rate sensor is used as the pressure sensor which measures the pressure of the liquid injected from the discharge nozzle. According to this aspect, it is possible to utilize the pressure sensors used as the flow rate sensor.

According to a fourth aspect of the invention, in the liquid micrometer of any one of the first to third aspects, the liquid flow path and the discharge nozzle are formed from metal, alloy steel, glass, ceramic or engineering plastic. According to this aspect, it is possible to eliminate a measurement error caused by variation in shape.

According to a fifth aspect of the invention, in the liquid micrometer of any one of the first to fourth aspects, the liquid is low viscosity liquid having kinetic viscosity of less than 20 mPa·s. According to this aspect, it is possible to make the calculation load small without requiring viscosity correction.

According to a sixth aspect of the invention, in the liquid micrometer of any one of the first to fifth aspects, the liquid is etching liquid of a silicon wafer. According to this aspect, it is possible to measure a thickness of a silicon wafer while etching the silicon wafer.

Embodiment

An embodiment of the present invention will be described below.

FIG. 1 is a block diagram showing a liquid micrometer according to the embodiment of the invention.

The liquid micrometer according to the embodiment includes a liquid flow path 30 which supplies liquid from a pump (liquid supply means) 10 to a discharge nozzle 20, a flow rate sensor 40 provided in the liquid flow path 30, a control valve 50 provided in the liquid flow path 30 between the pump 10 and the flow rate sensor 40, a controller 60 which controls the control valve 50 such that a flow rate measured by the flow rate sensor 40 becomes equal to a set value, a pressure sensor 70 which measures pressure of liquid injected from the discharge nozzle 20, and a calculating section 80 which calculates a size of a work A from pressure measured by the pressure sensor 70 in a state where the flow rate is maintained at the set value by the controller 60. The liquid micrometer injects liquid supplied from the pump 10 toward the work A from the discharge nozzle 20, and measures the size of the work A.

A differential pressure type flow rate sensor is used as the flow rate sensor 40. The differential pressure type flow rate sensor 40 includes a downstream side pressure sensor 42 at a location downstream of the narrowing mechanism 41 and an upstream side pressure sensor 43 at a location upstream of the narrowing mechanism 41.

The liquid micrometer according to the embodiment includes a circulation flow path 90 which branches off from the liquid flow path 30 between the pump 10 and the control valve 50 and which joins up with an upstream side flow path of the pump 10. The liquid micrometer also includes a circulation control valve 100 provided in the circulation flow path 90.

As compared with gas, liquid has no compressive properties, liquid is less affected by temperature, and viscosity variation of liquid caused by temperature variation is small. According to this embodiment, by using such liquid, measurement error is less likely to occur, it is possible to measure a size of a work without bringing the work into a dried state by using liquid, and if liquid is used, it is easy to control a flow rate constant, and by controlling the flow rate of the work constant, a calculation load can be made smaller as compared with pressure-constant control.

According to the embodiment, since the circulation flow path 90 is provided, it is easy to adjust the flow rate, and to control the flow rate constant.

The downstream side pressure sensor 42 constituting the flow rate sensor 40 can be used instead of the pressure sensor 70.

It is preferable that the liquid flow path 30 and the discharge nozzle 20 are formed from metal, alloy steel, glass, ceramic or engineering plastic. If the liquid flow path 30 and the discharge nozzle 20 are formed from materials having high rigidity, it is possible to eliminate a measurement error caused by variation in shape.

It is preferable that the liquid is low viscosity liquid having kinetic viscosity of less than 20 mPa·s. If the low viscosity liquid is used, it is unnecessary to correct the viscosity, and a calculation load can be made small.

If etching liquid of silicon wafer is used as the liquid, it is possible to measure a thickness of the silicon wafer while etching the silicon wafer.

FIG. 2 is a graph showing a result of a measurement test using the liquid micrometer according to the embodiment.

FIG. 2 shows a relation between a thickness of the work A and pressure measured by the pressure sensor 70.

A distance from the discharge nozzle 20 to a reference surface on which the work A is placed is set to 1 mm.

A water-passing flow rate was set to 3 L/min, a pressure difference was set to 60 kPa, and a diameter of the discharge nozzle 20 was set to 3.6 mm. SUS 304 was used as the discharge nozzle 20.

INDUSTRIAL APPLICABILITY

The present invention is especially suitable for measuring a work which is in a wet state.

EXPLANATION OF SYMBOLS 10 liquid supply means (pump)
20 discharge nozzle
30 liquid flow path
40 flow rate sensor
41 narrowing mechanism
42 downstream side pressure sensor
43 upstream side pressure sensor
50 control valve
60 controller
70 pressure sensor 80 calculating section
90 circulation flow path
100 circulation control valve
A work

The invention claimed is:

1. A liquid micrometer in which liquid suppled from liquid supply means is injected from a discharge nozzle toward a work to measure a size of the work, wherein the liquid micrometer comprises:
- a liquid flow path which supplies the liquid from the liquid supply means to the discharge nozzle:
- a flow rate sensor provided in the liquid flow path:
- a control valve provided in the liquid flow path between the liquid supply means and the flow rate sensor,
- a pressure sensor which measures pressure of the liquid injected from the discharge nozzle;
- a controller which controls the control valve such that a flow rate measured by the flow rate sensor becomes equal to a set value and maintains the flow rate at the set value when the size of the work is calculated based on the measured pressure; and
- a calculating section which calculates the size of the work from the pressure measured by the pressure sensor in a state where the flow rate is maintained at the set value by the controller.

2. The liquid micrometer according to claim 1, further comprising: a circulation flow path which branches off from the liquid flow path between the liquid supply means and the control valve and which joins up with an upstream side flow path of the liquid supply means; and a circulation control valve provided in the circulation flow path.

3. The liquid micrometer according to claim 1, wherein the flow rate sensor is composed of a plurality of pressure sensors, any of the pressure sensors constituting the flow rate sensor is used as the pressure sensor which measures the pressure of the liquid injected from the discharge nozzle.

4. The liquid micrometer according to claim 1, wherein the liquid flow path and the discharge nozzle are formed from metal, alloy steel, glass, ceramic or engineering plastic.

5. The liquid micrometer according to claim 1, wherein the liquid is low viscosity liquid having kinetic viscosity of less than 20 mPa·s.

6. The liquid micrometer according to claim 1, wherein the liquid is etching liquid of a silicon wafer.

* * * * *